(12) United States Patent
Wershe

(10) Patent No.: US 6,309,108 B1
(45) Date of Patent: Oct. 30, 2001

(54) BEARING SPACER FOR IN-LINE SKATE

(76) Inventor: Richard Wershe, 28020 Elba, St. Slair Shores, MI (US) 48081

( * ) Notice: Subject to any disclaimer, the term of this patent is extended or adjusted under 35 U.S.C. 154(b) by 0 days.

(21) Appl. No.: 08/893,890

(22) Filed: Jul. 11, 1997

(51) Int. Cl.$^7$ ................................................. F16C 37/00
(52) U.S. Cl. ................................................................. 384/476
(58) Field of Search ................................... 384/476, 512, 384/520, 551, 544

(56) References Cited

U.S. PATENT DOCUMENTS

| | | |
|---|---|---|
| 572,880 | 12/1896 | Flannigain . |
| 621,219 | 3/1899 | Burwell . |
| 2,610,897 | 9/1952 | Rebmann . |
| 4,502,738 | 3/1985 | Nauta . |
| 4,598,918 | 7/1986 | Rodriquez . |
| 4,687,349 | 8/1987 | Pachuta . |
| 4,735,262 * | 4/1988 | Lucas ................................. 384/476 |
| 4,872,771 | 10/1989 | Ueno et al. . |
| 4,883,370 | 11/1989 | Nakanishi . |
| 4,896,975 * | 1/1990 | Bescoby et al. ................... 384/320 |
| 5,425,585 | 6/1995 | Hoffmann et al. . |
| 5,527,050 | 6/1996 | Szendel . |

* cited by examiner

*Primary Examiner*—Lenard A. Footland
(74) *Attorney, Agent, or Firm*—Reising, Ethington, Barnes, Kisselle, Learman & McCulloch, PC

(57) ABSTRACT

A bearing spacer device for axially separating ball bearings in a skate wheel hub includes a generally cylindrical center portion that abuts and axially spaces the individual ball bearings within the skate wheel hub. A central bore extends coaxially through the center portion to receive an axle pin for mounting the skate wheel to a skate. A discontinuity formed in the outer surface of the center portion to reduce weight and improve airflow. The discontinuity may include a plurality of circumferentially spaced longitudinal grooves that extend along the length of the center portion. The discontinuity may alternatively include at least one radial hole that extends completely through the center portion. Reduced diameter cylindrical end portions may integrally extend axially outward from either end of the center portion for mounting the ball bearings.

12 Claims, 5 Drawing Sheets

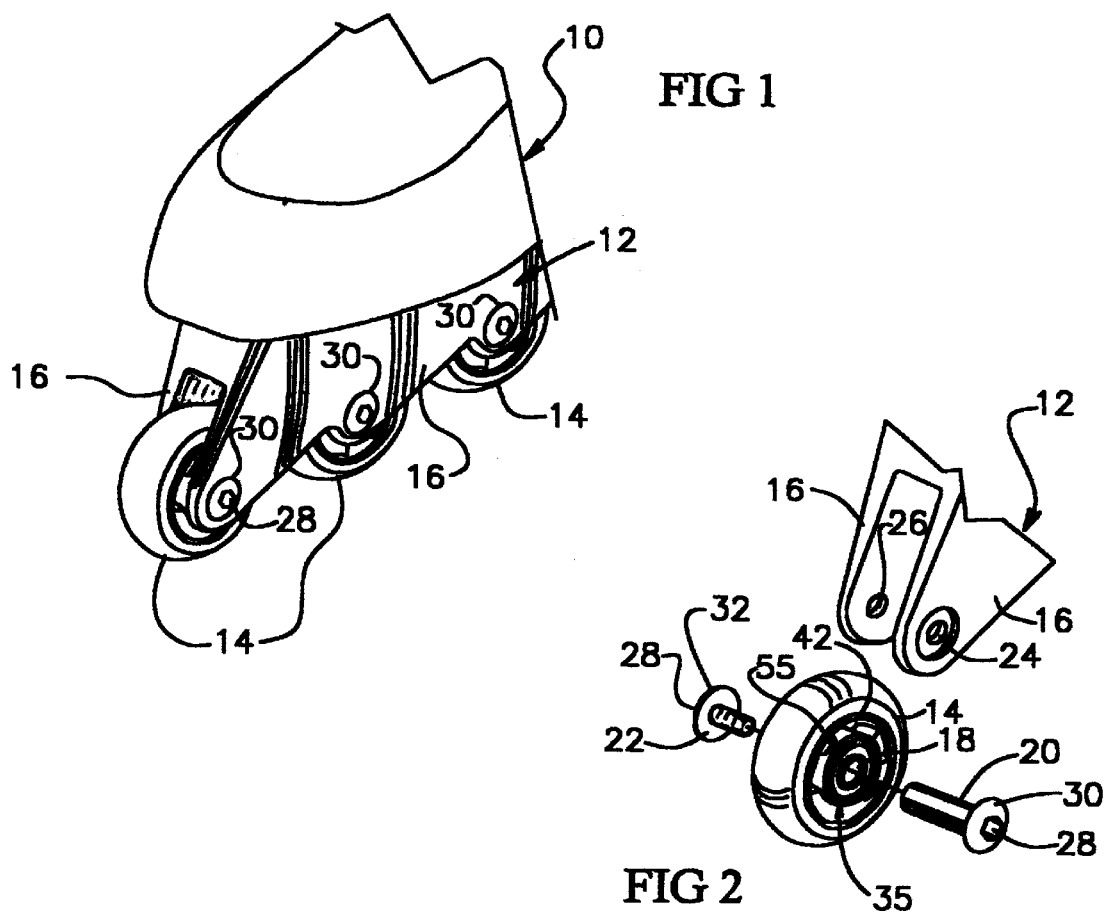
FIG 1
FIG 2
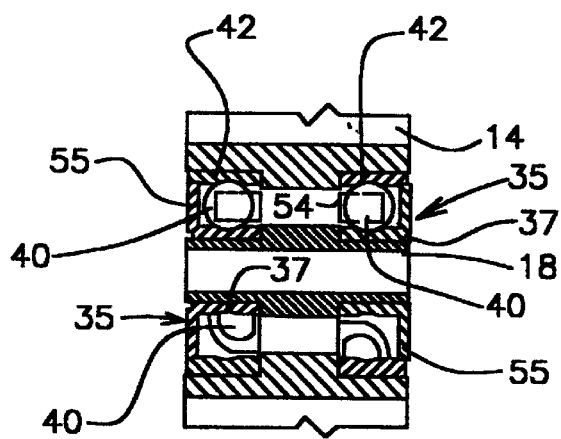
FIG 3

BEARING SPACER FOR IN-LINE SKATE

TECHNICAL FIELD

This invention relates generally to improved spacers for the bearing assemblies for mounting the wheels of in-line roller skates.

BACKGROUND OF THE INVENTION

In-line roller skates have seen great popularity. This popularity is due in part to constant improvements to decrease the effort to propel oneself and make the sport more enjoyable.

Known bearing assemblies include a pair of axially spaced ball bearings concentrically mounted within an annular wheel hub and mounted on a generally cylindrical annular bearing spacer or axle sheath. Each ball bearing typically includes a plurality of bearing balls mounted between inner and outer bearing races. Known bearing spacers conventionally comprise an enlarged center portion and reduced end portions. The inner races of the two ball bearings are commonly mounted on the respective reduced end portions in abutment with the respective opposite radial shoulders of the enlarged center portion so that the two ball bearings are axially spaced from each other.

Wheel bearing quality and condition significantly affect the amount of effort required to propel oneself on a pair of in-line skates. However, even high quality bearings that are in top condition will degrade in performance as friction between the bearing balls and the bearing races causes heat to build up within those structures. Heat build-up in the wheel bearings and bearing races of a typical ball bearing assembly causes those parts to expand in size and increases rolling friction. Increased rolling friction requires that a skater exert greater effort to maintain a given speed.

What are needed are improvements to wheel bearing assembly design that reduce rolling friction by reducing heat build-up.

SUMMARY OF THE INVENTION

In accordance with this invention a bearing spacer is provided for an in-line skate wheel bearing assembly. The spacer includes a generally cylindrical center portion with discontinuities formed in its outer surface to improve airflow within the bearing assembly. The center portion has a central longitudinal axis that extends between first and second center portion ends. A pair of radial shoulders are disposed at the first and second center portion ends to abut and axially space the individual ball bearings within a hub of the skate wheel. A central bore extends coaxially through the center portion to receive an axle pin for mounting the skate wheel to a skate.

According to another aspect of the present invention the discontinuity includes a plurality of circumferentially spaced longitudinal grooves.

According to another aspect of the present invention at least one groove extends from the first end to the second end of the center portion.

According to another aspect of the present invention the discontinuity includes at least one radial hole.

According to another aspect of the present invention at least one radial hole extends completely through the center portion.

According to another aspect of the present invention first and second reduced end portions integrally extending axially outward from the respective first and second center portion ends. The reduced end portions are generally cylindrical in shape. The center bore extends coaxially through the first and second reduced end portions.

BRIEF DESCRIPTION OF THE DRAWINGS

To better understand and appreciate the invention, refer to the following detailed description in connection with the accompanying drawings:

FIG. 1 is a fragmentary perspective view of an in-line skate having a bearing spacer of the invention in the bearing assemblies for the roller wheels;

FIG. 2 is an exploded view of the front wheel portion of the skate shown in FIG. 1;

FIG. 3 is a sectional view of the front wheel and its bearing assembly which is equipped with a bearing spacer of the invention

DETAILED DESCRIPTION OF THE PREFERRED EMBODIMENT

Figure 6:
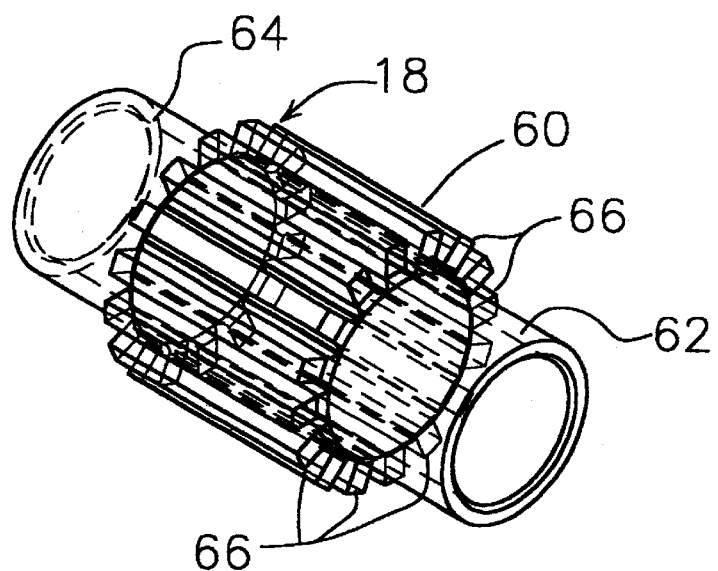
FIG. 6 is a perspective view of the bearing spacer shown in FIG. 3.

As shown in FIGS. 1 and 2, an in-line skate 10 has a wheel support bracket 12 holding wheels 14. The bracket 12 includes two flanges 16 spaced apart to fit wheel 14 and its bearing spacer 18. The bearing spacer 18 is mounted between the flanges 16 by an axle pin 20 and an axle bolt 22. The axle pin 20 is inserted through hole 24 and into the smooth round bore of the bearing spacer 18 until its head 30 engages the flange 16 around the hole 24. The axle bolt 22 is then inserted into the hole 26 of the opposite flange 16 and screwed into the threaded bore of the axle pin 20 until the head 30 of the axle bolt 22 engages the opposite flange 16 around the hole 26. Heads 30 each have a hexagonal socket 28 for screwing the axle bolt 22 into the axle pin 20 so as to fasten the bearing spacer 18 to the bracket 12 between the flanges 16. The mounted bearing spacer 18 is part of a bearing assembly that mounts the wheel 14 for rotation with respect to the bracket 12.

As best shown in FIG. 3, the bearing assembly further comprises two ball bearings 35 that are axially spaced from each other by the bearing spacer 18. Each ball bearing comprises an inner race 37, a complement of bearing balls 40 and an outer race 42 disposed within the wheel 14. The bearing balls 40 which run in arcuate raceways of the inner and outer races 37 and 42 are circumferentially spaced by commercially available bearing cages 54. A bearing cage 54 is inserted into the inboard end of each ball bearing 35 and snap fitted into place about the bearing balls 40 of the associated ball bearing 35. The outboard end of each ball bearing 35 has a sealing cap 55.

Figure 4:
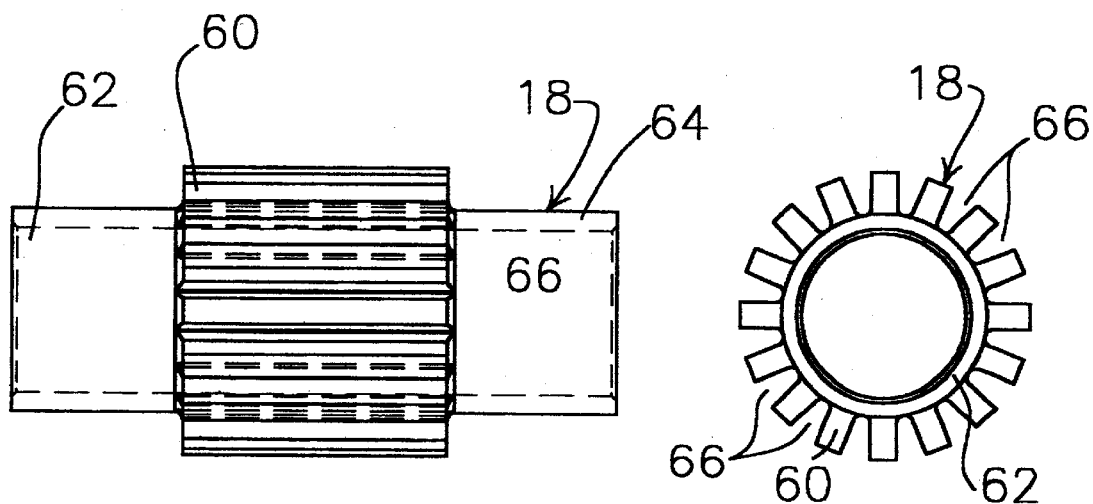
FIG. 4 is a front view of the bearing spacer shown in FIG. 3.
Figure 5:
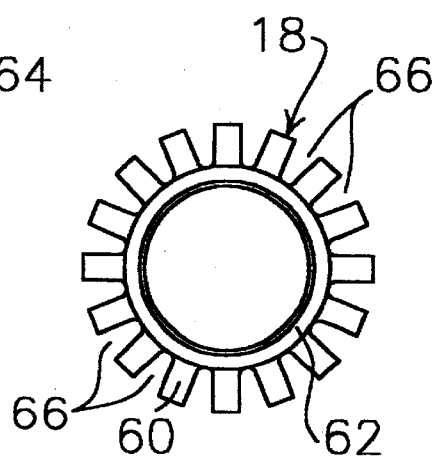
FIG. 5 is a side view of the bearing spacer shown in FIG. 3.

The bearing spacer 18 is shown in detail in FIGS. 4, 5 and 6. The bearing spacer 18 separates the individual ball bearings 35 of the bearing assembly from each other in the axial direction, prevents over tightening of the axle pin 20 and axle bolt 22 and aligns the ball bearings 35 perpendicular to the axis of the axle pin 20.

The bearing spacer 18 of the invention comprises an enlarged center portion 60 and reduced end portions 62 and 64 for receiving and separating the respective inner races of the two ball bearings 35 forming part of the bearing assembly. However, the enlarged center portion 60 is not solid as in conventional designs. The bearing spacer 18 of the invention has a plurality of surface discontinuities in the form of circumferentially spaced longitudinal grooves 66. The grooves 66 are preferably equally circumferentially spaced and preferably extend from end-to-end in the outer portion of the enlarged center portion 60. These grooves 66 reduce weight of the bearing assemblies which improves the performance of the skate wheels 14. The grooves 66 also increase the surface area of the enlarged center portion 60 of the bearing spacer 18 which acts as a heat sink for the ball bearings 35. The increased surface area dissipates more heat generated by the ball bearings 35 during operation and thus the grooves 66 also improve the performance of the skate wheels 14 from another standpoint.

While the longitudinal grooves 66 illustrated in the drawing are parallel to the longitudinal axis of the bearing spacer 18, other groove orientations can be used. For instance, straight grooves skewed with respect to the longitudinal axis or helical grooves can be used. Radial grooves longitudinally spaced from each other can also be used.

The bearing spacer 18 can also be mounted to the bracket 12 by threading the end portions of the bearing spacer bore and using two axle bolts.

Figure 9:
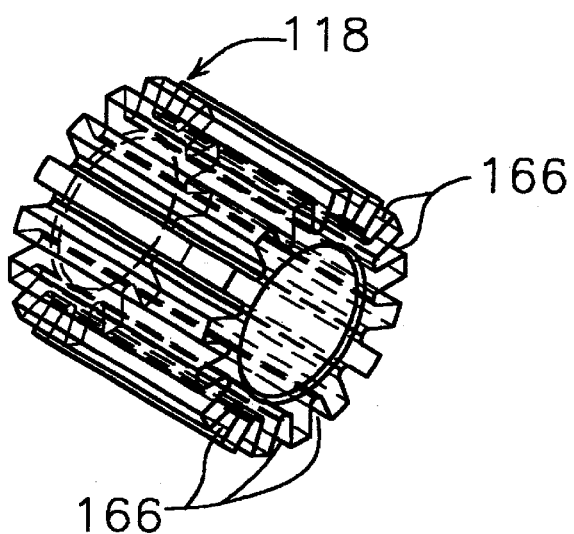
FIG. 9 is a perspective view of the bearing spacer shown in FIG. 7.
Figure 7:
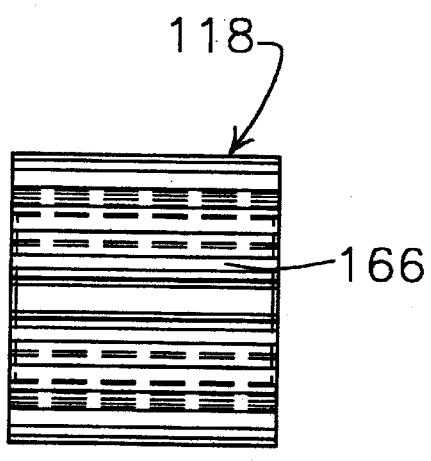
FIG. 7 is a front view of another bearing spacer of the invention.
Figure 8:
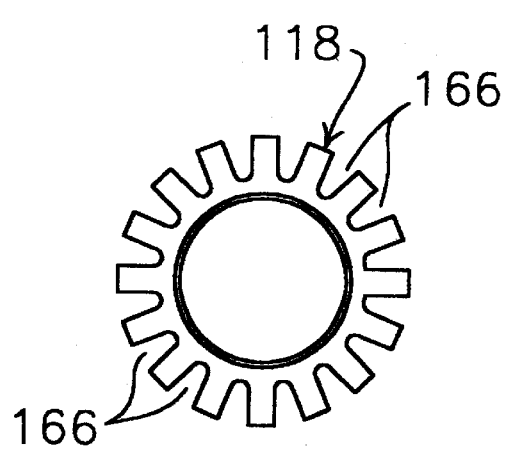
FIG. 8 is a side view of the bearing spacer shown in FIG. 7.

FIGS. 7, 8 and 9 show another bearing spacer 118 of the invention. This bearing spacer 118 is shorter and has a larger bore and the entire bearing spacer is grooved from end to end. In this version, longitudinal grooves 166 parallel to the axis of the bearing spacer are shown. However, other groove orientations and shapes as well as mounting arrangements can be used as indicated above. The bearing spacer 118 is used in a bearing assembly having a larger axle or axle pin 20 in which the ball bearings 35 are mounted directly on the axle or axle pin 20 with the short bearing spacer 118 between the inner spaces. In such cases the bearing spacer 118 still serves to separate the individual ball bearings 35 of the bearing assembly from each other. This is to prevent over tightening of the axle pin 20 and axle bolt 22 (or two axle bolts 22) and to align the ball bearings 35 perpendicular to the axis of the axle pin 20 or is equivalent.

Figure 11:
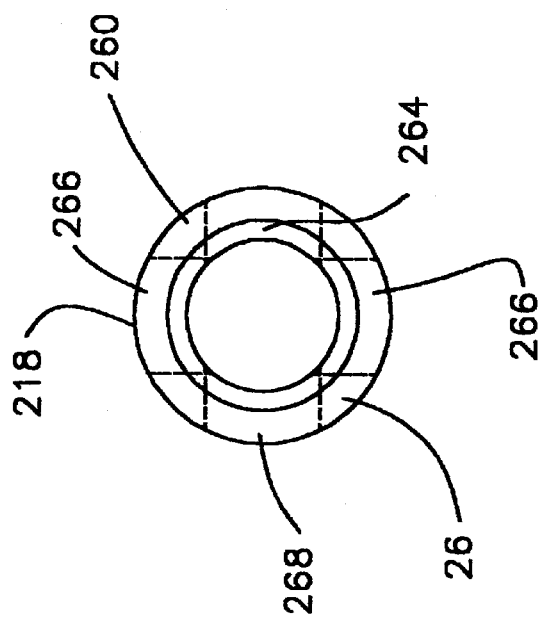
FIG. 11 is a side view of the bearing spacer shown in FIG. 10.
Figure 10:
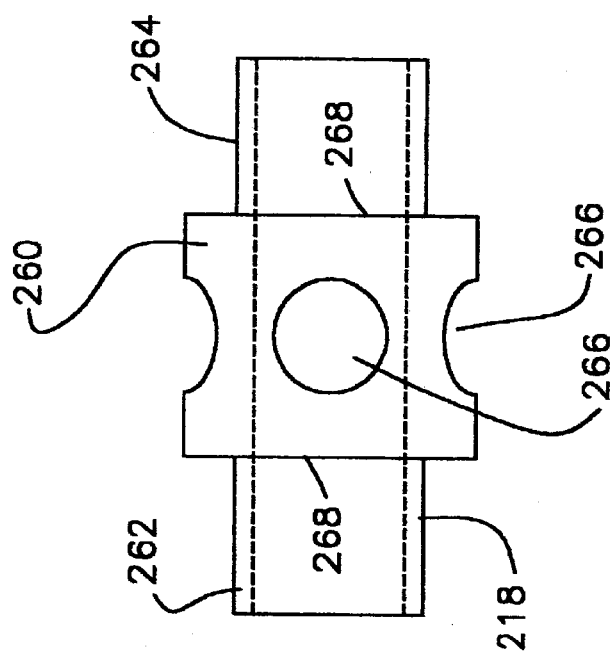
FIG. 10 is a front view of still another bearing spacer of the invention.
Figure 13:
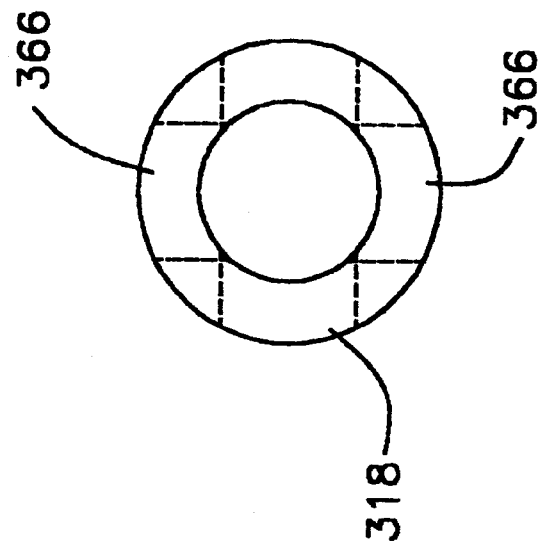
FIG. 13 is a side view of the bearing spacer shown in FIG. 12.

FIGS. 10 and 11 show still another bearing spacer 218 of the invention. The bearing spacer 218 is similar to the bearing spacer 18 shown in FIGS. 1–6 in that it comprises an enlarged canter portion 260 and reduced end portions 262 and 264. In this version, however, the center portion 260 has surface discontinuities formed by a plurality of circumferentially spaced radial holes 266 that extend through the center portion 260 in the radial direction. These holes 266 reduce the weight of the bearing spacer 218 and increase the surface area to improve heat dissipation and wheel performance as in the case of the bearing spacers described above.

Bearing spacer 216 has another advantage in that it has continuous annular shoulders 268 at the opposite ends of the center portion 260 for spacing the inner races of the two ball bearings while reducing weight and increasing surface area for heat dissipation. While a single row of radial holes 266 is illustrated, other hole patterns can be used.

Figure 12:
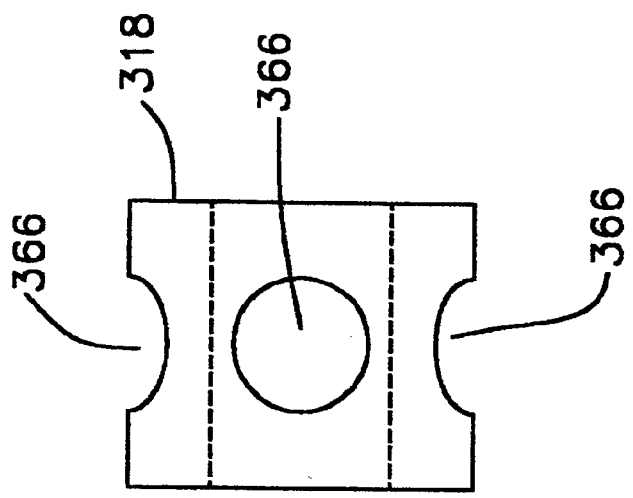
FIG. 12 is a front view of yet another bearing spacer of the invention.

FIGS. 12 and 14 show yet another bearing spacer 318 of the invention. This bearing spacer 318 is also short with a larger bore as in the case of the bearing spacer 118 shown in FIGS. 7, 8 and 9. However in this bearing spacer 318 radial holes 366 are again used to reduce weight and increase surface area, as is the case of the bearing spacer 218 shown in FIGS. 10 and 11. The bearing spacer 318 is used in the same type of bearing assembly as the bearing spacer 118.

I claim:

1. In a bearing spacer device for axially separating ball bearings in a skate wheel hub, the device comprising:

a generally cylindrical center portion having an outer surface extending between first and second axially opposite center portion ends and a central longitudinal axis extending between the first and second center portion ends;

a pair of radial shoulders disposed at the first and second center portion ends to abut and axially space the individual ball bearings within the skate wheel hub;

a central bore extending coaxially through the center portion to receive an axle pin for mounting the skate wheel to a skate; the improvement comprising:

a discontinuity formed in the outer surface of the center portion.

2. A bearing spacer device as defined in claim 1 in which the discontinuity includes a plurality of circumferentially spaced longitudinal grooves forming fins with free distal outer ends.

3. A bearing spacer device as defined in claim 2 in which at least one groove extends from the first end to the second end of the center portion.

4. A bearing spacer device as defined in claim 1 in which the discontinuity includes at least one radial hole.

5. A bearing spacer device as defined in claim 4 in which at least one radial hole extends completely through the center portion.

6. A bearing spacer device as defined in claim 1 further including first and second reduced end portions integrally extending axially outward from the respective first and second center portion ends, the reduced end portions being generally cylindrical in shape, the center bore extending coaxially through the first and second reduced end portions.

7. A bearing spacer device as defined in claim 1 further including first and second reduced end portions integrally extending axially outward from the respective first and second center portion ends, the reduced end portions being generally cylindrical in shape, the center bore extending coaxially through the first and second reduced end portions.

8. In a skate wheel comprising:

an annular cylindrical hub;

a pair of ball bearings concentrically mounted within the hub, each ball bearing comprising an inner race, and outer race, and a plurality of bearing balls;

a bearing spacer having a generally cylindrical center portion having an outer surface extending between first and second axially opposite center portion ends and a central longitudinal axis extending between the first and second center portion ends, the center portion including a pair of radial shoulders disposed at the first and second center portion ends to abut and axially space the individual ball bearings within the skate wheel hub;

a central bore extending coaxially through the center portion to receive an axle pin for mounting the skate wheel to a skate; the improvement comprising:

a discontinuity formed in the outer surface of the center portion.

9. A bearing spacer device as defined in claim 8 which the discontinuity includes a plurality of circumferentially-spaced longitudinal grooves forming fins with free distal radial outer ends.

10. A bearing spacer device as defined in claim 9 in which at least one groove extends from the first end to the second end of the center portion.

11. A bearing spacer device as defined in claim 8 in which the discontinuity includes at least one radial hole.

12. A bearing spacer device as defined in claim 10 in which at least one radial hole extends completely through the center portion.

* * * * *

UNITED STATES PATENT AND TRADEMARK OFFICE
CERTIFICATE OF CORRECTION

PATENT NO. : 6,309,108 B1
DATED : October 30, 2001
INVENTOR(S) : Richard Wershe

It is certified that error appears in the above-identified patent and that said Letters Patent is hereby corrected as shown below:

Column 4,
Line 48, before "device as defined" delete "a bearing spacer" and insert therein -- In a skate wheel --.
Line 48, after "in claim" delete "1" and insert therein -- 8 --.

Column 5,
Line 6, before "as defined" delete "A bearing spacer" and insert therein -- In a skate wheel --.

Column 6,
Line 1, before "as defined" delete "A bearing spacer" and insert therein -- In a skate wheel --.
Line 4, before "as defined" delete "A bearing spacer" and insert therein -- In a skate wheel --.
Line 6, before "as defined" delete "A bearing spacer" and insert therein -- In a skate wheel --.

Signed and Sealed this

Fifteenth Day of April, 2003

JAMES E. ROGAN
*Director of the United States Patent and Trademark Office*